US011215574B2

(12) United States Patent
Gyde Thomsen

(10) Patent No.: US 11,215,574 B2
(45) Date of Patent: Jan. 4, 2022

(54) MONITORING OF HEATED TUBES

(71) Applicant: HALDOR TOPSØE A/S, Kgs. Lyngby (DK)

(72) Inventor: Søren Gyde Thomsen, Kgs. Lyngby (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 494 days.

(21) Appl. No.: 16/095,736

(22) PCT Filed: May 3, 2017

(86) PCT No.: PCT/EP2017/060540
§ 371 (c)(1),
(2) Date: Oct. 23, 2018

(87) PCT Pub. No.: WO2017/194369
PCT Pub. Date: Nov. 16, 2017

(65) Prior Publication Data
US 2020/0333274 A1    Oct. 22, 2020

(30) Foreign Application Priority Data

May 9, 2016 (DK) .......................... PA 2016 00281

(51) Int. Cl.
*F28F 27/00* (2006.01)
*G01N 25/72* (2006.01)

(52) U.S. Cl.
CPC ............. *G01N 25/72* (2013.01); *F28F 27/00* (2013.01)

(58) Field of Classification Search
CPC ...... F01N 25/72; F28F 27/00; F27D 21/0014; G01N 25/72; B01J 2208/0053; B01J 2208/00539; B01J 2219/00159; B01J 2219/00162; B01J 8/062
USPC ........................................................ 702/179
See application file for complete search history.

(56) References Cited

U.S. PATENT DOCUMENTS

| 5,050,108 A | 9/1991 | Clark et al. |
| 5,355,845 A | 10/1994 | Burgess et al. |
| 6,424,930 B1 * | 7/2002 | Wood ................. G01R 31/2642 340/505 |
| 7,938,576 B1 | 5/2011 | Kychakoff et al. |
| 2001/0034581 A1 * | 10/2001 | Miwa ...................... G07C 3/14 702/42 |
| 2004/0243462 A1 * | 12/2004 | Stier ................ G06Q 10/06393 705/7.39 |
| 2005/0266363 A1 | 12/2005 | Ganeshan |
| 2006/0049352 A1 | 3/2006 | Irani |
| 2006/0050147 A1 | 3/2006 | Gao et al. |
| 2010/0042370 A1 | 2/2010 | Gallarda |
| 2010/0189227 A1 * | 7/2010 | Mannar ............. G05B 19/4184 378/207 |
| 2011/0113993 A1 | 5/2011 | Esmaili et al. |
| 2012/0089366 A1 * | 4/2012 | Huyse .................... G01M 3/00 702/170 |
| 2012/0125479 A1 * | 5/2012 | Brightling ................ G01K 1/14 141/2 |
| 2013/0176418 A1 | 7/2013 | Pandey et al. |
| 2014/0105243 A1 | 4/2014 | Tait |
| 2016/0003713 A1 * | 1/2016 | Merz ...................... G01N 33/18 73/864.51 |
| 2017/0173262 A1 * | 6/2017 | Veltz .................... A61B 5/0022 |
| 2018/0279429 A1 * | 9/2018 | Sadwick ............ H05B 45/3725 |
| 2018/0280914 A1 * | 10/2018 | Victor ..................... F28F 9/026 |
| 2019/0101336 A1 * | 4/2019 | Victor .................. C10G 11/187 |
| 2019/0228777 A1 * | 7/2019 | Papadimitriou .... G01M 5/0033 |

FOREIGN PATENT DOCUMENTS

| CN | 104749211 A | 7/2015 |
| EP | 2258997 A1 | 12/2010 |
| EP | 2325562 A2 | 5/2011 |
| FR | 2888920 A1 | 1/2007 |
| GB | 2103801 A | 2/1983 |

OTHER PUBLICATIONS

Danish Search Report dated Dec. 13, 2016, by the Danish Patent Office for corresponding Danish Application No. PA 2016 00281.
International Search Report (PCT/ISA/210) dated Jul. 13, 2017, by the European Patent Office as the International Searching Authority for International Application No. PCT/EP2017/060540.
Written Opinion (PCT/ISA/237) dated Jul. 13, 2017, by the European Patent Office as the International Searching Authority for International Application No. PCT/EP2017/060540.

* cited by examiner

*Primary Examiner* — Ly D Pham
(74) *Attorney, Agent, or Firm* — Buchanan Ingersoll & Rooney P.C.

(57) ABSTRACT

A method and an apparatus for detailed continuous monitoring of the thermal environment for a tube or a plurality of tubes and calculation and prediction of remaining lifetime of said tubes.

24 Claims, No Drawings

MONITORING OF HEATED TUBES

FIELD OF THE INVENTION

This invention relates to a method and an apparatus to monitor heated tubes. More particular, the invention relates to the continuous monitoring of the thermal environment for a tube or a plurality of tubes, calculate and estimate the remaining life time for said tubes, thereby minimizing the risk of failure while optimizing the life time of the tubes in various production facilities, especially chemical plants. Yet more particular the monitoring may be combined with logging the thermal data over time

BACKGROUND OF THE INVENTION

In a number of industrial processes, heated tubes are used as a necessary part of a chemical process. Typically, the tubes are heated by a burner and often a plurality of burners, producing a flame from combustion of one or more fuels.

Owners of chemical plants have a big interest in being able to do planned and preventive maintenance of their heated tubes, e.g. catalyst tubes, in order to avoid sudden creep based tube ruptures as may happen in for instance steam reformers. Such ruptures do invariably lead to costly plant down time, but may also give rise to even more widespread damage due to combustion of gasses which may be released from a ruptured tube. On the other hand, process tubes such as catalyst tubes are expensive and exchange of the tubes prior to having exhausted their life time is costly. It is therefore of significant value to a plant owner to be able to predict when will be the optimal time to exchange the tubes.

Reformer tubes and other tubes that are heated and operated with pressure in the creep range are designed to last for a certain life time; very often 100,000 hours based on an assumption (calculation) of the expected operating temperature and pressure. The calculation is based on available creep data for the material of construction typically furnished as a "Larson-Miller" plot by which the correlation between stresses in the tube is correlated with temperature and either a minimum lifetime (based on the 95% confidence limit) or an average time. It is noted that the lifetime is strongly dependent on both the operating pressure and the life temperature. For example, the life time will typically be reduced to 50% if the operating temperature consistently is 10 to 15° C. higher.

For a real operating plant, both pressure and temperature may differ from what was used to establish the initial life time. The variations will typically be periodically and will also vary from tube to tube as well as from area to area of each tube within the same furnace. The variations may be of a nature which would lead to a longer than predicted life time but may also be of a nature that leads to a reduced lifetime.

The typical and most widely used way to monitor the temperature on tubes in for instance a steam reformer is to use infrared pyrometry, in which an operator with a hand held pyrometer measures the temperature of the reformer tube. This is a tedious procedure and it is most often only carried out periodically, e.g. weekly, by-weekly, or monthly. Typically, it will not cover all tubes but only tubes selected to be representative. As the measurements require access to the furnace chamber, the conditions for the operator are both unpleasant and involve some hazards. Obviously, this method provides instant data only and will not be representative for the full operating period between two set of measurements.

It is also possible to measure the temperature by the use of thermocouples fixed to the tube wall. This is, however, a method which is rarely used because of the limited reliability of the thermocouples, shunt errors, and complexity of the installation.

In order to establish the tube life time, several methods can be used. These are often used in combination but still, experience shows that the results are often very inaccurate. The methods comprise Non-destructive examination by means of ultrasonic testing with special equipment to reveal creep damage. This method requires the tube be emptied, e.g. for catalyst and cleaned.

Measurement of diameter increase from initially and between scheduled plant shut downs.

Destructive testing of a tube that is sacrificed for this purpose, to accurately reveal internal creep damage and microstructural changes, possibly supplemented with accelerated creep testing to determine remnant life time.

Obviously, a need exists for a method and an apparatus for more accurately, more detailed, and with less hazards and costs to monitor the thermal environment over time for heated tubes, and to calculate and predict the remaining life-time and thus the prudent time for exchange of the tubes.

In known art, FR2888920 discloses a maintenance procedure for a hydrocarbon catalytic reforming kiln consisting of fitting at least one catalytic tube in the kiln with a temperature sensor connected to a data acquisition system that allows for continuous recording of temperature variations during the kiln's operation. The recorded temperatures are converted into a duration of the remaining life for each tube, on which a replacement plan can be based. The temperature sensor is attached to a downstream portion of the tube in relation to the reaction mixture's circulation, with measurements taken by at least one thermocouple and recorded by a SCADA (Supervisory Control and Data Acquisition) system capable of operation over a period of about ten years.

US20050266363 discloses a flame detection method and apparatus. More specifically, the invention relates to a method and apparatus designed for simultaneously monitoring several flames of different types such as pilot flames and main flames of differing sizes and intensity. These detected flames can be in one combustion unit or in several combustion units such as industrial furnaces or ground flares. The underlying principle of the invention is to collect and transmit light from each of the flames by use of optical fibres and to insect the collected light by a video camera vision system at the other end of the optical fibres and to transmit the "live" images of the glows as well as the "on/off" status of the burners to the control room, through modern electronic communication techniques such as Ethernet and/or wireless radio units.

US2010042370 describes a method for the maintenance of a furnace for the catalytic reforming of a hydrocarbon reaction mixture, equipped with tubes filled with catalyst and for which one portion of the tubes is provided with thermocouples, the method comprises a monitoring of the temperature of the tubes.

Despite this mentioned prior art, there is still a need for solving the problem of detailed monitoring of the thermal environment for all areas of heated tubes to enable calculation and prediction of remaining life-time and the optimal time for replacement of the tubes in an economical and non-hazardous manner.

SUMMARY OF THE INVENTION

A furnace manager system is continuously measuring the temperature of the reformer tube by means of a camera. These data are logged and with knowledge of tube pressure and duration of time at a certain temperature, it is possible to calculate the accumulated creep based life time consumption. This will enable the plant operator to predict when the tubes are near their end of life much more accurately than today and thereby plan the maintenance activity accordingly and have a much lower risk of unforeseen tube ruptures. The system will be usable in all applications where pressurized tubes are heated and operate in the creep range, e.g. fired heaters, ethylene crackers, power plant boilers and superheaters, steam-reformers etc.

The furnace manger system is monitoring and logging the temperature of the hottest part of the reformer tube. The temperature measurement is based on the recorded energy intensity of the photons emitted from the tube at the location of interest. This may be in the wavelength range of visible light to the near or mid infrared. Specifically, the temperature recording in our system may be based on the energy received in the spectral band of visible light and even more specifically at a wavelength of 650 nm at which interference with flue gas and flame radiation is avoided. This monitoring and logging of the temperature may be performed in intervals, continuously or constant. At the same time, the pressure in the tube is known—either as the inlet pressure (which is conservative) or via a calculation based on the current pressure drop over the tube.

For each time period, $\Delta t_i$, where the temperature and pressure is constant within a selected range, the consumed life time for the tube or sections of the tube is calculated by applying the life fraction rule. The internal pressure gives rise to a hoop stress which together with the temperature is used to calculate a total expected lifetime (minimum or average), $t_i$ for that temperature and pressure pair—using the Larson-Miller relationship for the specific tube material. The consumed life fraction will then be $\Delta t_i/t_i$.

The life fraction rule states that the life time of the tube is exhausted when $$\sum_{i=1}^{N} \frac{\Delta ti}{ti} > 1,$$

where N are the number of consecutive time periods that have been identified with constant temperature and pressure.

Since the monitoring of temperature according to the invention is performed by a camera, all parts of a tube or a plurality of tubes (a tube bank) can be monitored over time. This is possible because of the wide viewing angle of the camera or several cameras and also possible by varying the viewing angle/direction of the camera(s). It has the advantage that variations in the thermal environment for the tubes are captured and logged. Even though a certain part, e.g. the down-stream part of a catalyst tube may be the hottest and therefore most challenged part of the tube on average, there may be time periods where other sections of the tube experiences higher temperatures, which is logged by the present invention and taken into account for the total remaining life time calculation of the tube. Furthermore, flow restrictions and catalyst activity within a catalyst tube may also change over time, and this may also lead to changes in the thermal environment for the tube or sections of the tube. The life time of a tube is exhausted when any section of the tube has exhausted its lifetime.

With this method, the plant will at all times have an accurate estimation of the remaining lifetime of each and every tube that is being monitored with the furnace manager system. In this way, the plant can plan the best possible time to change the tubes and at the same time make sure, that the tubes are utilized fully from a life time perspective.

FEATURES OF THE INVENTION

1. Method for monitoring of the thermal environment for a tube or a plurality of tubes and calculation and prediction of the remaining lifetime of said tubes comprising the steps of
monitoring the temperatures on or adjacent to said tubes by means of an installed camera, and
calculating a predicted remaining lifetime for at least one of said tubes or at least one group with a plurality of tubes on a basis comprising the logged temperatures.
2. Method according to feature 1, further comprising the steps of
logging said monitored temperatures in intervals over time,
summarizing the time periods where the tubes have experienced the logged temperatures, and
calculating a predicted remaining lifetime for each tube or a group with a plurality of tubes on a basis comprising the sum of time periods where said tubes have experienced the logged temperatures.
3. Method according to any of the preceding features, wherein said tubes are mounted in a furnace or any high temperature environment.
4. Method according to any of the preceding features, wherein said camera is a cooled camera adapted to be permanent mounted in a furnace or any high temperature environment.
5. Method according to any of the preceding features, further comprising an optical fibre or fibre optics connected to said camera and adapted to be mounted in a furnace or any high temperature environment.
6. Method according to any of the preceding features, wherein said camera is adapted to monitor the temperature of a plurality of sections of each tube or a group with a plurality of tubes, whereby different predicted remaining lifetimes can be calculated for said plurality of sections of each tube or group with a plurality of tubes.
7. Method according to any of the preceding features, wherein said logging, summarizing and calculating is done by means of a computer.
8. Method according to any of the preceding features, wherein said logging, summarizing and calculating is performed either solely or supplementary geographically remote to the position of the tubes.
9. Method according to any of the preceding features, wherein said calculating is performed on a basis comprising logged values for the pressure in said tubes during said intervals over time.
10. Method according to any of the preceding features, wherein said calculating is performed on a basis comprising the Larson-Miller method and a life fraction rule.
11. Method according to any of the preceding features, wherein said calculated predicted remaining lifetime is further used in a step to compile a maintenance plan or a preventive maintenance program for said tubes.

12. Method according to any of the preceding features, wherein said monitoring and logging of temperatures is further used to predict thermal damage, conditions during start-up, trip and shut-down with or without internal pressure in the tubes.

13. System for monitoring the thermal environment for a tube or a plurality of tubes and calculation and prediction of the estimated remaining lifetime of said tubes comprising
   a temperature monitoring camera, and
   means for calculating a predicted remaining lifetime for at least one of said tubes or at least one group of a plurality of tubes on a basis comprising the logged temperatures.

14. System for according to feature 13, further comprising
   means for logging the monitored temperatures in intervals over time,
   means for summarizing the time periods where the tubes have experienced the logged temperatures and
   means for calculating a predicted remaining lifetime for each tube or a group of a plurality of tubes on a basis comprising the sum of time periods where said tubes have experienced the logged temperatures.

15. System according to feature 14, wherein the tubes and the camera are mounted in a furnace or any high temperature environment.

16. System according to feature 13-15, wherein said camera is a cooled camera adapted to be mounted in a furnace or any high temperature environment.

17. System according to any of the features 13-16, further comprising an optical fiber or fiber optics connected to said camera and adapted to be mounted in a furnace or any high temperature environment.

18. System according to any of the features 13-17, wherein said camera is adapted to monitor the temperature of a plurality of sections of each tube or a group with a plurality of tubes, whereby different predicted remaining lifetimes can be calculated for said plurality of sections of each tube or group with a plurality of tubes.

19. System according to any of the features 13-18, further comprising a computer adapted to perform said logging, summarizing and calculating.

20. System according to any of the features 13-19, further comprising means to monitor and log the pressure in said tubes during said intervals over time.

21. System according to any of the features 13-20, wherein the means for calculating said predicted remaining lifetime comprise the Larson-Miller method.

22. Use of a method according to any of the features 1-12 for tubes in a steam reformer, fired heaters, ethylene crackers, power plant boilers and super-heaters.

23. Use of a system according to any of the features 13-21 for tubes in a steam reformer, fired heaters, ethylene crackers, power plant boilers and super-heaters.

The invention claimed is:

1. A method for monitoring of a thermal environment for a tube or a plurality of tubes and calculation and prediction of a remaining lifetime of said tubes comprising the steps of
   monitoring temperatures on or adjacent to said tubes by means of an installed camera,
   logging said monitored temperatures in intervals over time, and
   calculating a predicted remaining lifetime for at least one of said tubes or at least one group with a plurality of tubes on a basis comprising the logged temperatures,
   wherein said logging and calculating are performed either solely or supplementary geographically remote to the position of the tubes.

2. The method according to claim 1, further comprising the steps of
   summarizing time periods where the tubes have experienced the logged temperatures, and
   calculating a predicted remaining lifetime for each tube or a group with a plurality of tubes on a basis comprising a sum of time periods where said tubes have experienced the logged temperatures.

3. The method according to claim 2, wherein said logging, summarizing and calculating is done by means of a computer.

4. The method according to claim 1, wherein said tubes are mounted in a furnace or any high temperature environment.

5. The method according to claim 1, wherein said camera is a cooled camera permanent mounted in a furnace or any high temperature environment.

6. The method according to claim 1, wherein the monitoring is performed continuously or constantly.

7. The method according to claim 1, further comprising an optical fiber or fiber optics connected to said camera and adapted to be mounted in a furnace or any high temperature environment.

8. The method according to claim 1, wherein said camera is adapted to monitor a temperature of a plurality of sections of each tube or a group with a plurality of tubes, whereby different predicted remaining lifetimes can be calculated for said plurality of sections of each tube or group with a plurality of tubes.

9. The method according to claim 1, wherein said calculating is performed on a basis comprising logged values for a pressure in said tubes during said intervals over time.

10. The method according to claim 1, wherein said calculating is performed on a basis comprising the Larson-Miller method and a life fraction rule.

11. The method according to claim 1, wherein said calculated predicted remaining lifetime is further used in a step to compile a maintenance plan or a preventive maintenance program for said tubes.

12. The method according to claim 1, wherein said monitoring and logging of temperatures is further used to predict thermal damage, conditions during start-up, trip and shut-down with or without internal pressure in the tubes.

13. The method according to claim 1, wherein the tube or plurality of tubes is in a steam reformer, fired heaters, ethylene crackers, power plant boilers and super-heaters.

14. A method for monitoring of a thermal environment for a tube or a plurality of tubes and calculation and prediction of a remaining lifetime of said tubes comprising the steps of
   monitoring temperatures on or adjacent to said tubes by means of an installed camera,
   logging said monitored temperatures in intervals over time, and
   calculating a predicted remaining lifetime for at least one of said tubes or at least one group with a plurality of tubes on a basis comprising logged temperatures,
   wherein the remaining lifetimes of the monitored tubes is calculated by means of the formula:

$$\Sigma_{i=1}^{N} \Delta t_i / t_i > 1,$$

where $\Delta t_i$ is each time period where the temperature and pressure is constant within a selected range, $t_i$ is the total expected lifetime (minimum or average) for that temperature and pressure pair, $\Delta t_i / t_i$ is the consumed life fraction and N are the number of consecutive time periods that have been identified with constant temperature and pressure.

15. A system for monitoring the thermal environment for a tube or a plurality of tubes and calculation and prediction of the estimated remaining lifetime of said tubes comprising
   a temperature monitoring camera,
   means for logging the monitored temperatures in intervals over time, and
   means for calculating a predicted remaining lifetime for at least one of said tubes or at least one group of a plurality of tubes on a basis comprising the logged temperatures,
   wherein said logging and calculating is performed either solely or supplementary geographically remote to the position of the tubes.

16. The system for according to claim 15, further comprising
   means for summarizing the time periods where the tubes have experienced the logged temperatures, and
   means for calculating a predicted remaining lifetime for each tube or a group of a plurality of tubes on a basis comprising a sum of time periods where said tubes have experienced the logged temperatures.

17. The system according to claim 16, wherein the tubes and the camera are mounted in a furnace or any high temperature environment.

18. The system according to claim 15, wherein said camera is a cooled camera adapted to be mounted in a furnace or any high temperature environment.

19. The system according to claim 15, further comprising an optical fiber or fiber optics connected to said camera and adapted to be mounted in a furnace or any high temperature environment.

20. The system according to claim 15, wherein said camera is adapted to monitor a temperature of a plurality of sections of each tube or a group with a plurality of tubes, whereby different predicted remaining lifetimes can be calculated for said plurality of sections of each tube or group with a plurality of tubes.

21. The system according to claim 15, further comprising a computer adapted to perform said logging, summarizing and calculating.

22. The system according to claim 15, further comprising means to monitor and log a pressure in said tubes during said intervals over time.

23. The system according to claim 15, wherein the means for calculating said predicted remaining lifetime comprise the Larson-Miller method.

24. The system according to claim 15, wherein the tube or plurality of tubes is in a steam reformer, fired heaters, ethylene crackers, power plant boilers and super-heaters.

* * * * *